United States Patent Office 3,066,116

Patented Nov. 27, 1962

3,066,116

POLYESTERS USING MOLECULAR SIEVE TO REMOVE ETHYLENE GLYCOL

Arthur M. Schiller, New Canaan, Conn., and William F. Oliver, Rye, N.Y., assignors to American Cyanamid Company, New York, N.Y., a corporation of Maine No Drawing. Filed May 26, 1959, Ser. No. 815,776
7 Claims. (Cl. 260—75)

This invention relates to a novel process for preparing polyester resinous materials. More particularly, this invention relates to a process for producing polyester resinous materials by refluxing a bis ester of ethylene glycol and a dicarboxylic acid dissolved in an organic solvent with the subsequent entrapment of ethylene glycol by means of a molecular sieve.

One of the objects of the present invention is to produce polyester resins from bis esters of ethylene glycol and a dicarboxylic acid. A further object of the present invention is to produce high molecular weight polyester resins by an economical and efficient process through a transesterification mechanism. These and other objects of the present invention will be discussed in greater detail hereinbelow.

The principal starting material used in the process of the present invention is a bis ester of ethylene glycol and a dicarboxylic acid. These bis esters can be prepared by a plurality of different processes, many of which are well known in the prior art. These bis esters can be prepared by reacting an excess of ethylene glycol with the selected dicarboxylic acid or with the diacyl halide of the selected dicarboxylic acid or, wherever available, with the anhydride of the dicarboxylic acid. These bis esters are fundamentally monomeric in form although in producing these bis esters, it is not detrimental to the process of the present invention if dimers and trimers are present in small amounts. By reacting the ethylene glycol with the selected dicarboxylic acid where the former is present in an excess amount over and beyond the stoichiometrically calculated amounts of ethylene glycol required to substantially completely esterify the carboxyl groups in the dicarboxylic acid, one esterifies substantially all of the carboxyl groups while leaving one hydroxy group on each ethylene glycol residue in an unesterified state.

The dicarboxylic acids used to prepare the bis esters used as the starting material in the present invention may be either a dicarboxylic acid free of non-benzenoid unsaturation or it may be an alpha, beta-ethylenically unsaturated dicarboxylic acid. Among the latter materials, one may use maleic, fumaric, itaconic, citraconic, chloromaleic acids, and the like. Among the dicarboxylic acids free of non-benzenoid unsaturation which may be used to prepare the bis esters used in the present invention are phthalic acid including terephthalic acid, isophalic acid and ortho-phthalic acid, oxalic acid, malonic acid, succinic acid, glutaric acid, sebacic acid, adipic acid, pimelic acid, suberic acid, azelaic acid, tartaric acid, malic acid and the like. Additionally, one may utilize any of the alkylidene bis benzoic acids such as those disclosed in the U.S. Patent 2,848,486, all of which are incorporated herein by reference, and the propylidene bis benzoic acids disclosed in the U.S. Patent 2,794,822. Additionally, one may utilize any of the indane dicarboxylic acids disclosed in the U.S. Patent 2,873,262, all of which are incorporated herein by reference. These acids may be used either singly or in combination with one another in the preparation of the bis esters of ethylene glycol but ordinarily it is preferred to use but one dicarboxylic acid, as a general rule, although for particular properties in the ultimate polyester resin, mixtures are sometimes desirable.

In the practice of the process of the present invention, one utilizes a normally liquid inert organic solvent and preferably those which have a boiling point between about 80° C. and 300° C. Preferably, one would select an organic solvent which boils between about 150° C. and 250° C. Illustrative of the normally liquid inert organic solvents which may be used in the process of the present invention are benzene, toluene, xylene, mineral spirits, ditolyl-butane, tetrahydronaphthalene, diphenyl oxide, t-butyl toluene, dioxane, trichlorobenzene, tetrachlorobenzene, and the like.

The amount of bis ester which is dissolved in the inert organic solvent prior to the initiation of the process of the present invention may be varied rather substantially and will depend in some measure upon the boiling point of the solvent selected and the viscosity of the solution of polyester resin. Ordinarily, one may use between about 10% and 80% by weight of the bis ester solids based on the total weight of the ester and the solvent. Preferably, one would utilize between about 40% and 70% by weight of the bis ester based on the total weight of said ester and solvent.

In carrying out the present process, it is highly desirable to pass an inert gas through the reaction medium. A plurality of inert gases are available for use in the process of the present invention. Nitrogen is preferred because of its effectiveness and complete inertness in the system.

If one wished to prepare a linear polyester resin in which the glycol utilized was different from ethylene glycol, one could prepare the bis ester of ethylene glycol with a dicarboxylic acid and introduce into the sphere of reaction an alkane diol having at least three carbon atoms in an amount stoichiometrically calculated to transesterify the bis ester of the dicarboxylic acid wherein substantially all of the ethylene glycol is removed from the polyester resin and supplanted with the higher diol residue. Among the alkane diols which may be used in the practice of the process of the present invention in one embodiment are propanediol-1,3; butanediol-1,4; pentanediol-1,5; hexanediol-1,6; heptanediol-1,7; octanediol-1,8; nonanediol-1,9; decanediol-1,10, and the like. It is not imperative that each of the hydroxy groups be positioned on terminal carbon atoms or that either of them be on terminal carbon atoms inasmuch as their positioning on an intermediate carbon atom or atoms permits the process to be carried out satisfactorily but it is preferred for linear polyester resin purposes that the hydroxy groups be positioned on terminal carbon atoms.

In the practice of the process of the present invention, a transesterification catalyst is not imperatively used but is highly desirable for best results. These transesterification catalysts are well known in the art and include such materials as zinc acetate, litharge, lead acetate, antimony trifluoride, antimony oxide or any of the Lewis acids or any of the transesterification catalysts shown in the U.S. Patents 2,641,592; 2,650,213; 2,711,402; 2,720,502; 2,729,619; 2,739,957 and 2,808,390. The amounts of these transesterification catalysts used in the present process are conventional amounts as is well known in the art and any further elaboration thereon is deemed to be unnecessary.

In practicing the present process, the bis ester is dissolved in the inert organic solvent introduced into a reaction vessel equipped with thermometer, stirrer and reflux condenser with inert gas inlet and outlet tubes and the selected amount of transesterification catalyst. While passing the inert gas through the liquid phase of the system and with constant stirring, the charge is heated to the boiling point of the solvent system, resulting in the azeotropic distillation of the ethylene glycol. A selected trap system is utilized which permits the return of the insert solvent to the reaction vessel while permitting the removal of the ethylene glycol. There are two trap systems principally used in such an operation, one of which is designed for use where the inert solvent is more dense than the ethylene glycol and the other of which is utilized when the inert solvent is less dense than the ethylene glycol. In the former instance, the inert solvent settles into the lower portion of the trap system and is returned to the reaction vessel while the less dense ethylene glycol can be removed from the top of the trap system. In the latter system, the inert solvent floats on the top of the ethylene glycol and is returned to the reaction sphere through the top of the trap system and the ethylene glycol is drained from the bottom of the trap. The azeotropic distillation is carried forward at the reflux temperature until no further ethylene glycol is perceptibly being removed. At this point, the molecular sieve is installed into the reaction vessel and while maintaining the system at reflux, the refluxed material is passed through the molecular sieve prior to its return to the sphere of reaction, which sieve absorbs or separates the ethylene glycol from the refluxing material but does not absorb the inert solvent, thereby permitting the inert solvent to pass through the molecular sieve and to return to the reaction vessel. Ordinarily, about 95% of the ethylene glycol can be removed during the azeotropic distillation. A further 5% remains available for separation from the polyester resin, but without benefit of the molecular sieve, the additional 5% is separated only with the utmost difficulty. By using the molecular sieve, the additional 5% is removed substantially completely, thereby yielding an exceedingly high molecular weight polyester resin.

The molecular sieves used in the process of the present invention are alkali metal alumino-silicates quite similar to many natural clays and feldspars. These molecular sieves are available commercially and may be acquired from the Union Carbide Company under the trademark "Linde Molecular Sieves." These alkali metal alumino-silicates are heated to drive off the water of hydration. This dehydration step does not cause the crystal to collapse or rearrange as is the case with many other hydrated materials but instead the physical structure of the crystal remains unchanged which results in a network of empty pores and cavities that comprise about one-half of the total volume of the crystals. One type of molecular sieve particularly suited for use in the process of the present invention is one produced through the ion exchange of about 75% of the sodium ions by calcium ions. These molecular sieves have a pH of approximately 10 and are stable over a substantial range of the pH scale. These molecular sieves have a crystal structure which is cubis, $a_0=12.32$ angstroms, space group $$O\frac{1}{h}-P_m3_m$$

characterized by a three-dimensional network consisting of cavities 11.4 angstroms in diameter separated by circular openings 4.2 angstroms in diameter (pore diameter). Removal of the crystal water leaves mutually connected intra-crystalline voids amounting to about 45 volume percent of the zeolite. Substantially all adsorption takes place in the intra-crystalline voids. The internal surface area is 700–800 square meters per gram and the external area is 1 to 3 square meters. The volume of the voids in cubic centimeters per gram is 0.28. The pore diameter is 4.2 angstroms and will admit molecules up to about 5 angstroms in diameter. These molecular sieves are available commercially in 1/16" and 1/8" pellet size. Reference is made to the U.S. Patents 2,882,243 and 2,882,244.

In carrying out the last step of the present process, reaction is continued until an intrinsic viscosity of 0.4 deciliter/gram is reached as a minimum, reflecting a molecular weight of about 10,000 weight average molecular weight. The reaction can be continued until an intrinsic viscosity of about 1.0 to about 1.2 is reached. For many purposes, it is preferred to continue the reaction until the intrinsic viscosity is 0.6.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

*Example 1*

Into a suitable reaction vessel equipped with thermometer, stirrer, reflux condenser, inert gas inlet and outlet tubes, there is introduced 100 parts of ethylene glycol diester of 2,2'-butylidene bis-p-benzoic acid, 85 parts of tetrahydronaphthalene with 0.001 part of zinc acetate. The charge is heated under a blanket of nitrogen gas at the reflux temperature until approximately 15 parts of ethylene glycol is separated from the condensed azeotrope mixture of tetrahydronaphthalene and ethylene glycol. At this point, the reaction vessel itself contains a solution of relatively low molecular weight polyester in tetrahydronaphthalene. A Dean Stark trap filled with Linde Molecular Sieve No. 5A is installed so that the condensed vapors pass through the molecular sieve on return to the reaction site. After 30 hours of sieve treatment, a polymer of intrinsic viscosity equal to 0.58 in tetralin is realized.

*Example 2*

Example 1 is repeated in every detail except that in the place of the tetrahydronaphthalene, there is substituted an equivalent amount of alpha-methyl naphthalene as the inert organic solvent. The molecular weight increase is evidenced by the rapid increase in polymer solution viscosity after 7 hours of molecular sieve treatment.

*Example 3*

The procedure of Example 1 is repeated in every detail except that in the place of the tetrahydronaphthalene, there is substituted an equivalent amount of xylene as the solvent. After about 7 hours of molecular sieve treatment, there resulted an increase in molecular weight as evidenced by increase in polymer solution viscosity.

*Example 4*

100 parts of ethylene glycol diester of 2,2'-butylidene bis-p-benzoic acid are dissolved in sufficient tetrahydronaphthalene to give a final solids of 50% based on the theoretical monomeric bis ester content. Zinc acetate (0.005 atoms Zn/mol of monomeric bis ester) and antimony trifluoride (0.001 atom Sb/mol of monomeric bis ester) were used as transesterification catalysts. The procedure of Example 1 was followed until the azeotrope mixture yielded no additional ethylene glycol whereupon the molecular sieve was installed and after 16 hours of treatment, a polyester resin was produced having an intrinsic viscosity value of 0.34 in tetralin.

*Example 5*

100 parts of ethylene glycol diester of 2,2'-propylidene bis-p-benzoic acid are dissolved in sufficient tetrahydronaphthalene to give a final solids of 50%. Zinc acetate, 0.001 part, is added, and the procedure of Example 1 is followed. After 18 hours of molecular sieve treatment, the intrinsic viscosity was 0.40 in tetralin.

*Example 6*

100 parts of ethylene glycol diester of 2,2'-butylidene bis-p-benzoic acid was dissolved in sufficient unsymmetrical trichlorobenzene to give a final solids of 60%. Zinc acetate, 0.001 part, was added. Ethylene glycol was azeotroped off using a bottom return distillate trap. After about 4 hours azeotroping, a column of molecular sieve was fixed in place and the distillate passed through before returning to the reaction vessel. Reaction was continued for 6 hours. Then additional unsymmetrical trichlorobenzene was added to give a final solids of 50%. After another 10 hours, the intrinsic viscosity of the polymer was 0.53.

*Example 7*

200 parts of bis-p-hydroxyethyl isophthalate was dissolved in tetrahydronaphthalene to give a final solids of 50%. Zinc acetate, 0.001 part, was added. After azeotroping off the ethylene glycol until separation of the glycol from the distillate stop, a molecular sieve column was put into place and the reaction continued. The reaction was stopped after 16 hours to give a polymer of intrinsic viscosity equal to 0.38.

*Example 8*

130 parts of the ethylene glycol diester of 2,2′-butylidene bis-p-benzoic acid plus 100 parts of the bis-β-hydroxyethyl ether of bis-phenol A were charged to the reaction vessel along with sufficient tetrahydronaphthalene to give a final solids of 50%. Zinc acetate, 0.001 part, was added. The reaction was heated to reflux and the ethylene glycol azeotroped off. 90% of the ethylene glycol present in the reaction was recovered. A molecular sieve column was put into place and reaction continued for 18 hours. A polymer of intrinsic viscosity equal to 0.42 was obtained.

We claim:

1. A process comprising heating a bis ester of ethylene glycol and a dicarboxylic acid dissolved in a normally liquid inert organic solvent at the reflux temperature in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

2. A process comprising heating an alkane diol having at least three carbon atoms, a bis ester of ethylene glycol and a dicarboxylic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

3. A process comprising heating a bis ester of ethylene glycol and a phthalic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

4. A process comprising heating a bis ester of ethylene glycol and an alkylidene bis benzoic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

5. A process comprising heating a bis ester of ethylene glycol and a butylidene bis benzoic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

6. A process comprising heating a bis ester of ethylene glycol and a propylidene bis benzoic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

7. A process comprising heating a bis ester of ethylene glycol and isophthalic acid dissolved in a normally liquid inert organic solvent at the reflux temperature, in the presence of a transesterification catalyst, removing the released ethylene glycol from the refluxed material while returning said inert solvent to the reaction sphere until no further ethylene glycol is removed, continuing refluxing while passing the refluxed materials through a molecular sieve so as to remove from the refluxed materials substantially all additional ethylene glycol released while returning the inert solvent to the reaction sphere wherein said molecular sieve has pore openings sufficiently large to admit molecules up to about five angstroms in diameter.

References Cited in the file of this patent

UNITED STATES PATENTS

| | | |
|---|---|---|
| 2,242,367 | Seidel | May 20, 1941 |
| 2,681,360 | Vodonik | June 15, 1954 |
| 2,892,812 | Helbing | June 30, 1959 |
| 2,949,408 | Bauer et al. | Aug. 16, 1960 |